Sept. 8, 1936.   C. OVERHOLSER   2,053,735
VEHICLE WHEEL
Filed Jan. 22, 1935   2 Sheets-Sheet 2
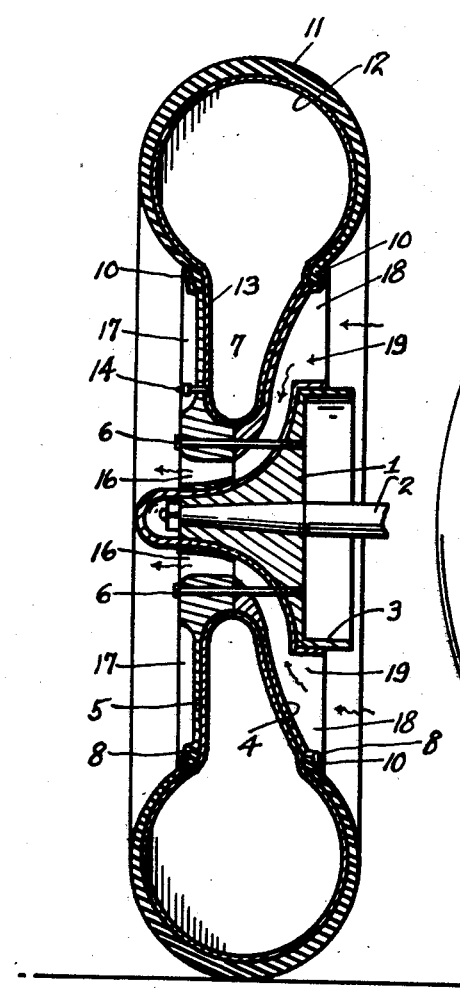
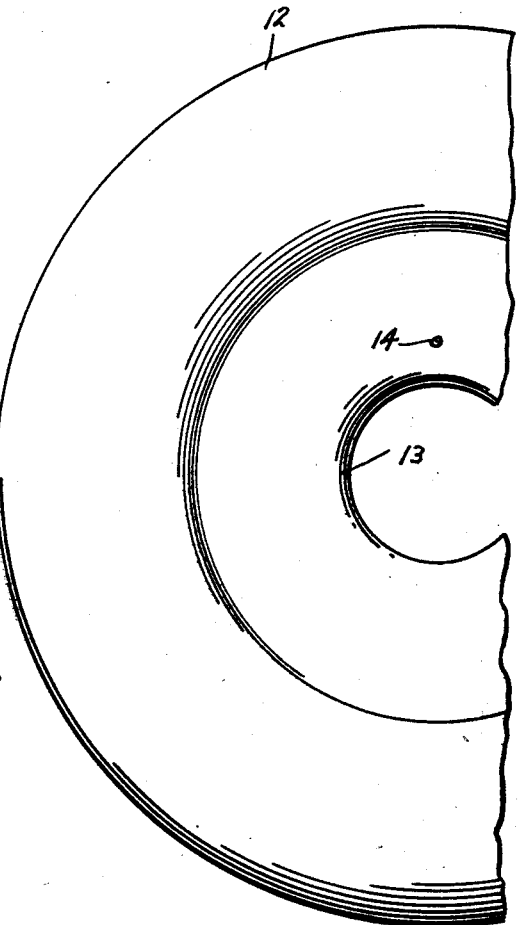
Inventor
Claude Overholser
By *Clarence A. O'Brien*
Attorney Patented Sept. 8, 1936

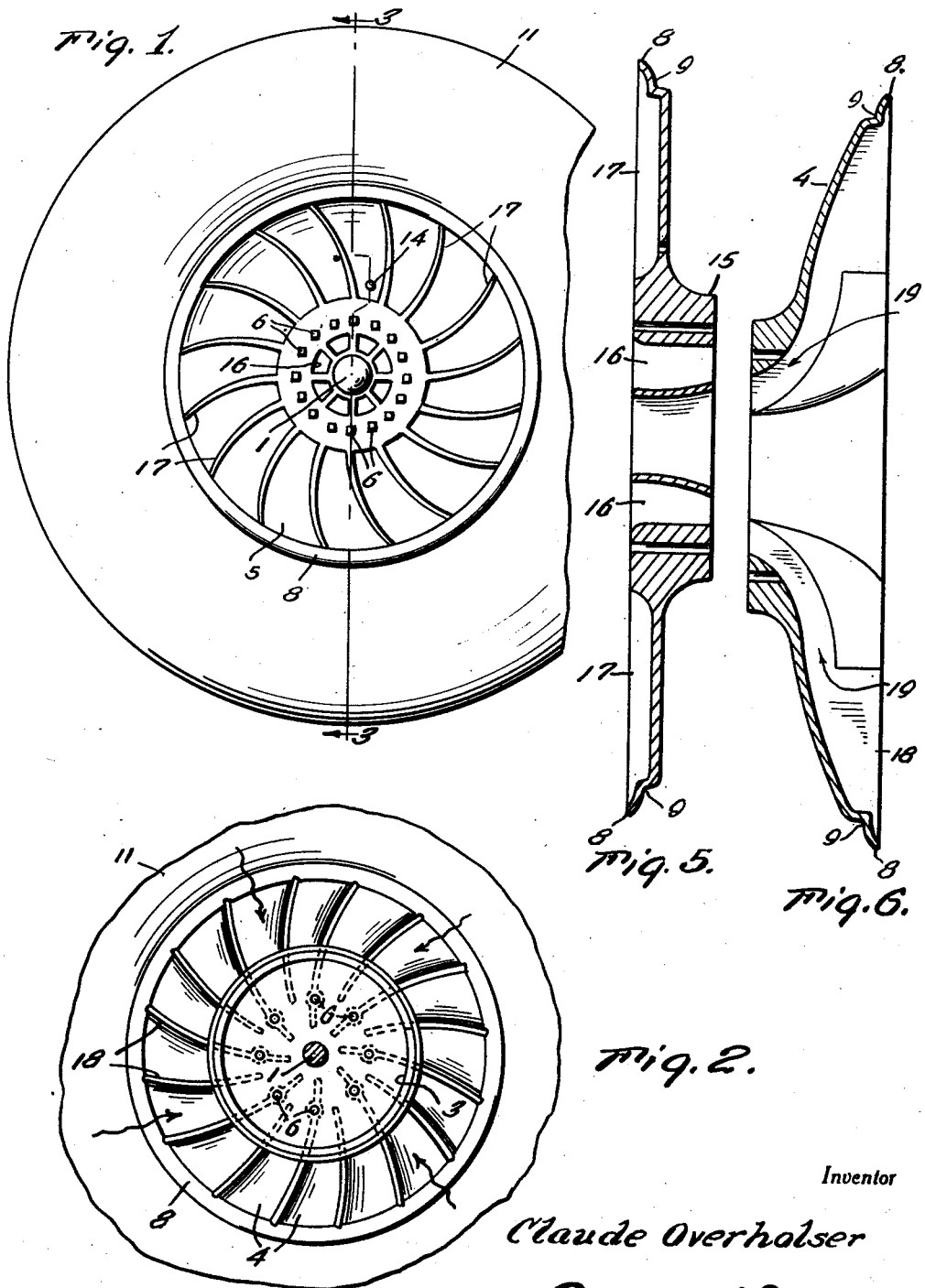

2,053,735

UNITED STATES PATENT OFFICE 2,053,735

VEHICLE WHEEL

Claude Overholser, Jefferson, Oreg.

Application January 22, 1935, Serial No. 2,932

1 Claim. (Cl. 301—6)

The present invention relates to new and useful improvements in wheels for automobiles of the type including a pneumatic tire and a brake drum and has for its primary object to provide, in a manner as hereinafter set forth, a wheel of this character comprising a novel construction, combination and arrangement of parts through the medium of which the tire and drum will be effectively coded.

Another important object of the invention is to provide a wheel of the character described comprising a novel construction through the medium of which the tire may be expeditiously repaired or removed and replaced when desired.

Still another important object of the invention is to provide an automobile wheel embodying means for materially increasing the air capacity and consequently the cushioning quality of the pneumatic tire.

Other objects of the invention are to provide an automobile wheel of the character set forth which will be comparatively simple in construction, strong, durable, reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a fragmentary elevational view of a vehicle wheel constructed in accordance with the present invention, looking at the outer side thereof.

Figure 2 is a fragmentary elevational view of the invention looking at the inner side thereof.

Figure 3 is a vertical sectional view, taken substantially on the line 3—3 of Figure 1.

Figure 4 is a fragmentary view in side elevation of the pneumatic tire tube.

Figure 5 is a view in vertical section through the outer wheel disk.

Figure 6 is a view in vertical section through the inner wheel disk.

Referring now to the drawings in detail, it will be seen that the embodiment of the invention which has been illustrated comprises a hub structure 1 which is secured in the usual manner on an axle shaft 2. The hub 1 includes a brake drum 3 on its inner side, as illustrated to advantage in Figure 3 of the drawings.

Inner and outer disks 4 and 5, respectively, of suitable metal are mounted on the hub 1. The disks 4 and 5 are secured together by bolts 6 certain of which are comparatively long for threaded engagement in the hub 1 for securing the assembled disks 4 and 5 thereon. The disks 4 and 5 are formed to provide, in conjunction with each other, an annular channel or chamber 7. The disks 4 and 5 are further provided with outwardly offset peripheral flanges 8 which define seats 9 (see Figures 3, 5 and 6) for the reception of the beads 10 of a pneumatic tire casing 11. The casing 11 is preferably of the low pressure type. The reference numeral 12 designates the tire tube within the casing 11, said tube 12 including an extension 13 on its inner periphery which is engaged in the annular chamber 7. An inflating valve 14 extends from the extension 13 of the tube 12 through an opening which is provided therefor in the outer disk 5.

The comparatively thick central or hub portion 15 of the disk 5 has formed therein a plurality of openings or ports 16. Extending between the central portion 15 and the flange 8 on the outer face of the disk 5 are arcuate, substantially tangential fins 17. The fins 17 are so shaped and arranged as to force air toward the center or hub of the wheel as said wheel rolls forwardly.

On its inner face, the disk 4 has formed thereon fins 18 of substantially the shape shown to advantage in Figures 2 and 6 of the drawings. The fins 18 are shaped or formed to accommodate the hub structure 1 and the brake drum 3 and, in conjunction with said brake drum and the disk 4, define air channels or passages which communicate with the openings 16 in the outer disk 5. Briefly, the operation of the invention is as follows:

As the wheel rolls in a forward direction air is caught by the fins 18 and forced inwardly through the passages 19 which are defined by said fins 18, the air then passing through the openings 16, thus effectively cooling the drum 3 and the air in the tube 12 by reason of the fact that the tube extension 13 is in direct contact with the disk 4. Cooling of the tire is also aided by direct contact of one of the walls of the extension 13 with the outer disk 5 which, as hereinbefore stated, is cooled by air caught by the fins 17 and directed inwardly toward the central portion 15 of said disk 5.

Should it be desired to repair the tire without removing same from the rim said tire, is of course, raised out of engagement with the ground and deflated. Then, by collapsing the casing 11 on one side to permit said casing to drop into the chamber 7, the beads on the diametrically opposite side portion will clear the flanges 8, thus permitting access to be had to the tube 12.

It is believed that the many advantages of a wheel constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

Having thus described the invention, what is claimed as new is:

In a wheel structure, inboard and outboard discs, means for securing said discs together adjacent their central portions, one of said discs being diverged with respect to the other to provide a chamber, means at the peripheries of the discs whereby a tire can be secured thereto, said discs being provided with central openings, a hub structure having a reduced extension disposed through the central openings of the discs, said securing means engaging and retaining the said hub structure secured to said discs, said outboard disc being provided with ports, said inboard being provided with ports registering with the ports of the outboard discs, and fins on the inboard side of the inboard disc for directing air into the ports of the said inboard disc.

CLAUDE OVERHOLSER.